United States Patent
Thielemans et al.

(10) Patent No.: US 7,071,894 B1
(45) Date of Patent: Jul. 4, 2006

(54) METHOD OF AND DEVICE FOR DISPLAYING IMAGES ON A DISPLAY DEVICE

(75) Inventors: Robbie Thielemans, Deerlijk (BE); Peter Gerets, Roeselare (BE)

(73) Assignee: BARCO, naamloze vennootschap, Kortrijk (BE)

( * ) Notice: Subject to any disclaimer, the term of this patent is extended or adjusted under 35 U.S.C. 154(b) by 0 days.

(21) Appl. No.: 09/926,408

(22) PCT Filed: Apr. 19, 2000

(86) PCT No.: PCT/BE00/00039

§ 371 (c)(1),
(2), (4) Date: Feb. 4, 2002

(87) PCT Pub. No.: WO00/65432

PCT Pub. Date: Nov. 2, 2000

(30) Foreign Application Priority Data

Apr. 28, 1999 (BE) .................................. 9900306

(51) Int. Cl.
*G09G 5/00* (2006.01)
(52) U.S. Cl. ...................... 345/1.1; 345/1.2; 345/1.3; 345/3.1; 345/3.4
(58) Field of Classification Search .......... 345/1.1–1.3, 345/3.1, 3.4, 204, 87; 715/751; 713/501
See application file for complete search history.

(56) References Cited

U.S. PATENT DOCUMENTS

| | | | | |
|---|---|---|---|---|
| 5,396,257 A * | 3/1995 | Someya et al. | ............... | 345/1.1 |
| 5,523,769 A * | 6/1996 | Lauer et al. | ................. | 345/1.3 |
| 5,634,018 A * | 5/1997 | Tanikoshi et al. | ........... | 715/751 |
| 5,758,135 A * | 5/1998 | Tucker et al. | ................ | 713/501 |
| 6,005,557 A * | 12/1999 | Wong | .......................... | 345/204 |
| 6,097,351 A * | 8/2000 | Nishida | ...................... | 345/1.3 |
| 2002/0158823 A1 * | 10/2002 | Zavracky et al. | ............. | 345/87 |
| 2005/0078104 A1 * | 4/2005 | Matthies et al. | ............ | 345/204 |

* cited by examiner

*Primary Examiner*—Bipin Shalwala
*Assistant Examiner*—Prabodh Dharia
(74) *Attorney, Agent, or Firm*—Bacon & Thomas, PLLC

(57) ABSTRACT

A method for displaying images on a display device. The display device includes a general processing unit, a display having several display units and an individual processing unit per display unit. In order to display the images, data concerning the image to be displayed are transmitted from the general processing unit to the individual processing units in the form of a data stream, in that there is a control communication between the general processing unit and each of the individual processing units in the form of control signals. The data from the data stream are collected at every individual processing unit as a function of the control signals transmitted to the individual processing units.

22 Claims, 3 Drawing Sheets

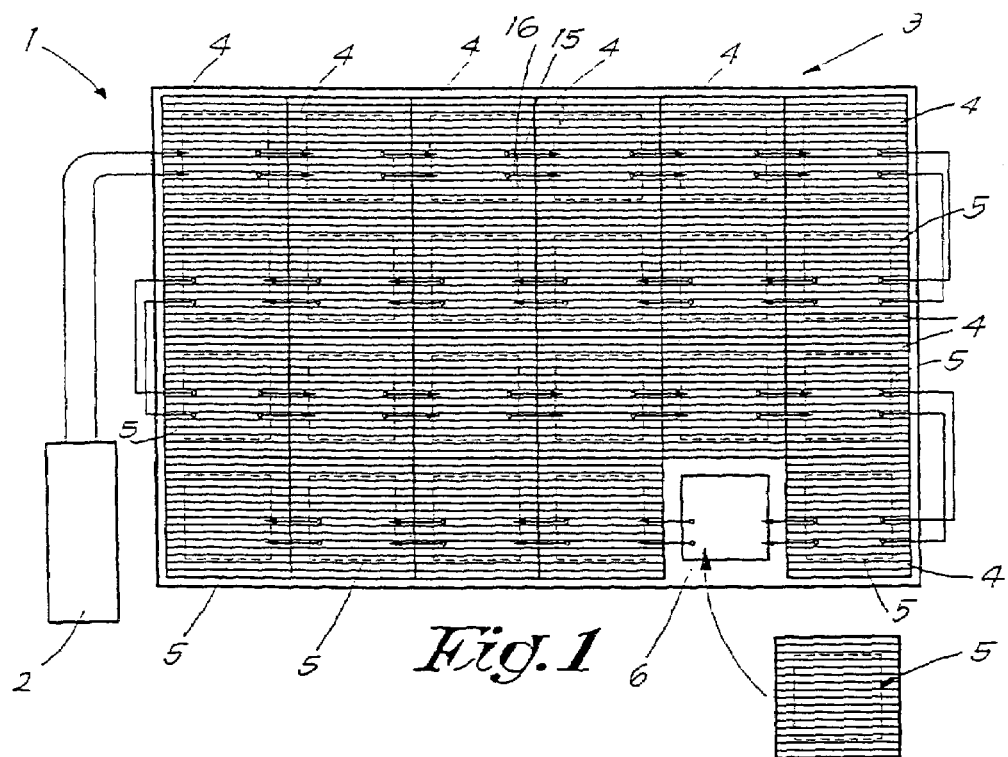
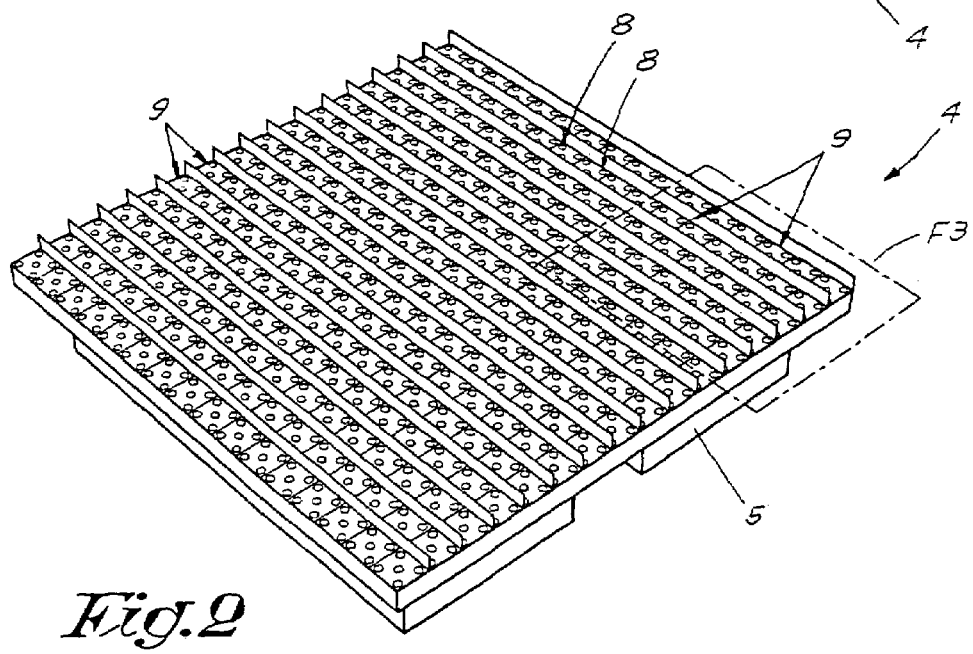

METHOD OF AND DEVICE FOR DISPLAYING IMAGES ON A DISPLAY DEVICE

The present invention concerns a method for displaying images on a display device, as well as a display device for realising this method.

In particular, the invention concerns display devices comprising a display which consists of several display units, whereby these display units are driven by means of a general processing unit, as well as by means of individual processing units per display unit.

In particular, it concerns display devices which make it possible to display images on a large image surface.

The invention is particularly meant for display devices comprising display units whereby the image is reproduced by means of what are called LED's (Light Emitting Diodes).

It is known that an LED wall can so to say be built in this manner. It is also known that, by building the LED wall from groups of LED's of different colours, in particular red, blue and green, by appropriately adjusting the intensity of the different LED's, it is possible to obtain various global colour effects. Also, by means of an appropriate control of the LED's, it is possible to reproduce moving images in colour, for example video images, on the LED wall.

Such display devices can be used for different purposes, for example for displaying images in stadiums, information and/or publicity in public buildings, such as for example airports, stations, etc.

A display device with active modules is known from U.S. Pat. No. 5,523,769. Data are exchanged here between a general processing unit and one central, individual processing unit, which further communicates with the other individual processing units. The different processing units can also communicate among themselves.

This known device is disadvantageous in that a large number of mutual data exchanges are required, so that the system is very restricted as far as calculation possibilities are concerned.

The invention aims a method for representing images on a display device of the above-mentioned type, whereby this method allows for a smoother data processing than according to the methods known until now.

In the first place, the method of the invention is designed for LED screens, but it can also be applied in a more general way in other display devices, such as CRT projectors and the like.

To this aim, the invention concerns a method for displaying images on a display device, characterised in that use is made of a display device comprising at least a general processing unit, a display consisting of several display units and an individual processing unit per display unit, whereby, in order to display the images, data concerning the image to be displayed are transmitted from the general processing unit to the individual processing units in the form of a data stream, in that there is a control communication between the general processing unit and each of the individual processing units in the form of control signals, and in that data from the data stream are collected at every individual processing unit as a function of the control signals transmitted to the individual processing units.

As the data stream is offered to each of the individual processing units on the one hand, and there is a control communication on the basis of which the individual processing units are driven on the other hand, one obtains that every display unit can work independently of the other ones, requiring no communication with a central individual processing unit. As no mutual data exchange is required between the individual processing units, there will be less data transmission, making more calculation time and calculation capacity available for processing the signals in the individual processing units.

Use is preferably made of display units which are serially coupled. As a result of this, the total display can be easily composed in any size whatsoever, without a large number of electric connections being required on the back side of the display.

As already mentioned, use is preferably made here of display units consisting of LED panels.

According to the most preferred embodiment, a distributed signal processing will be provided for according to the invention between the general processing unit on the one hand and the individual processing units on the other hand. This implies that a number of calculations are made in the general processing unit, whereas a number of other calculations are made in each of the individual processing units. This requires less data exchange between the general processing unit and the individual processing units for the drive, making calculation time available in the general processing unit, as well as transmission time for data via the data line between the general processing unit and the individual processing units which can then be used for a refined transmission of data for displaying the image.

The invention also concerns a display device for realising the above-mentioned method, characterised in that it consists at least of a general processing unit; a display consisting of several display units; an individual processing unit per display unit; means which transmit at least data concerning the image to be displayed transmitted from the general processing unit to the individual processing units in the form of a data stream; means providing for a control communication between the general processing unit and each of the individual processing units in the form of control signals; and, per individual processing unit, means which collect data from the data stream as a function of the transmitted control signals for further processing and display.

In order to better explain the characteristics of the invention, the following preferred embodiment according to the invention is described as an example only without being limitative in any way, with reference to the accompanying drawings, in which:

FIG. 1 schematically represents a display device according to the invention;

FIG. 2 represents a model of the display device in FIG. 1 in perspective;

Figure 7:
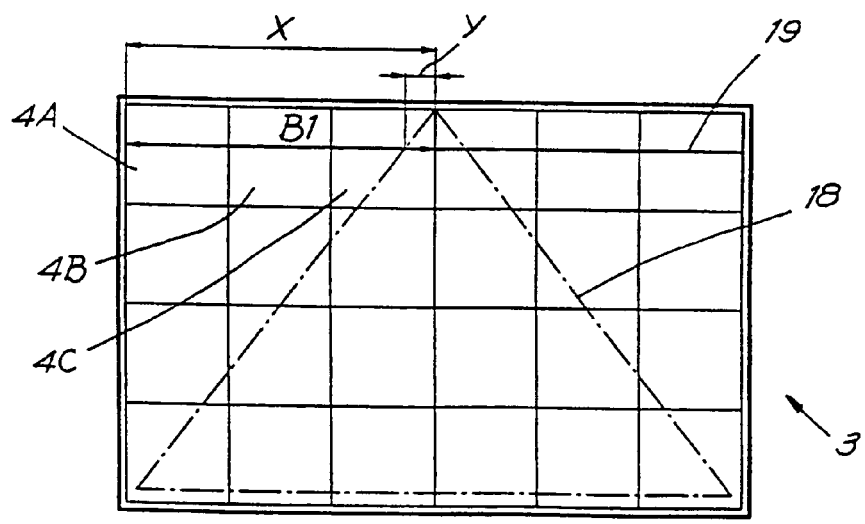

FIG. 7 schematically represents a special image geometry.

As represented in FIG. 1, the display device 1 according to the invention mainly consists of a general processing unit 2 and a display 3 consisting of a screen which is composed of several display units 4, whereby every display unit 4 is equipped with an individual processing unit 5.

The general processing unit 2, also called digitizer or video engine, consists of an appliance which transforms image signals, either coming from an external source or from an internal source, such as a built-in video player, into digitised signals which are suitable for the reproduction of the image on the display 3.

Figure 3:
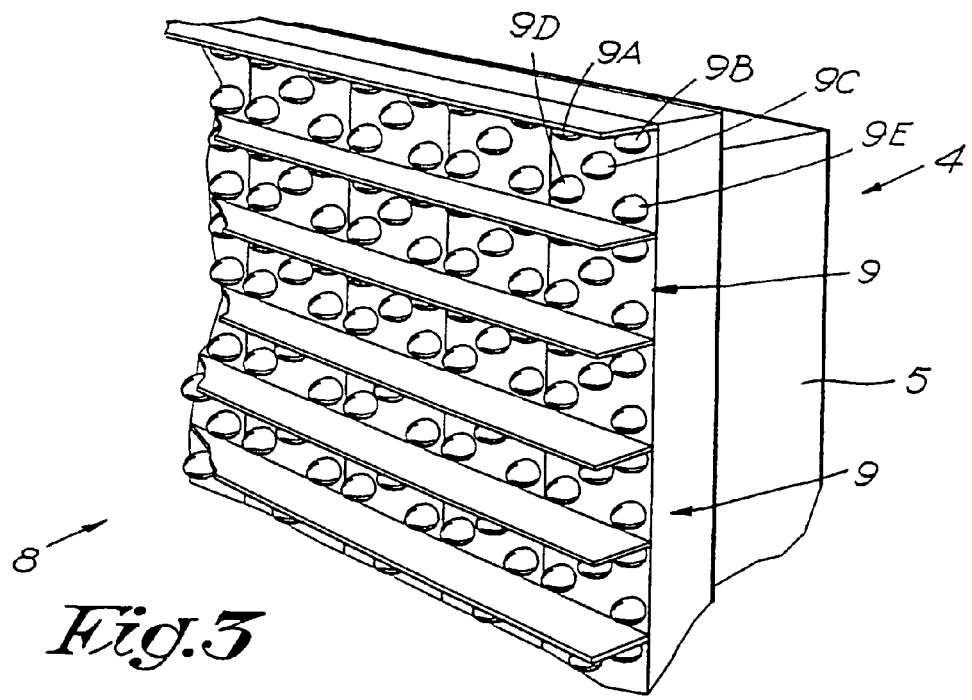
FIG. 3 represents the part which is indicated by F3 in FIG. 2 to a larger scale.
Figure 4:
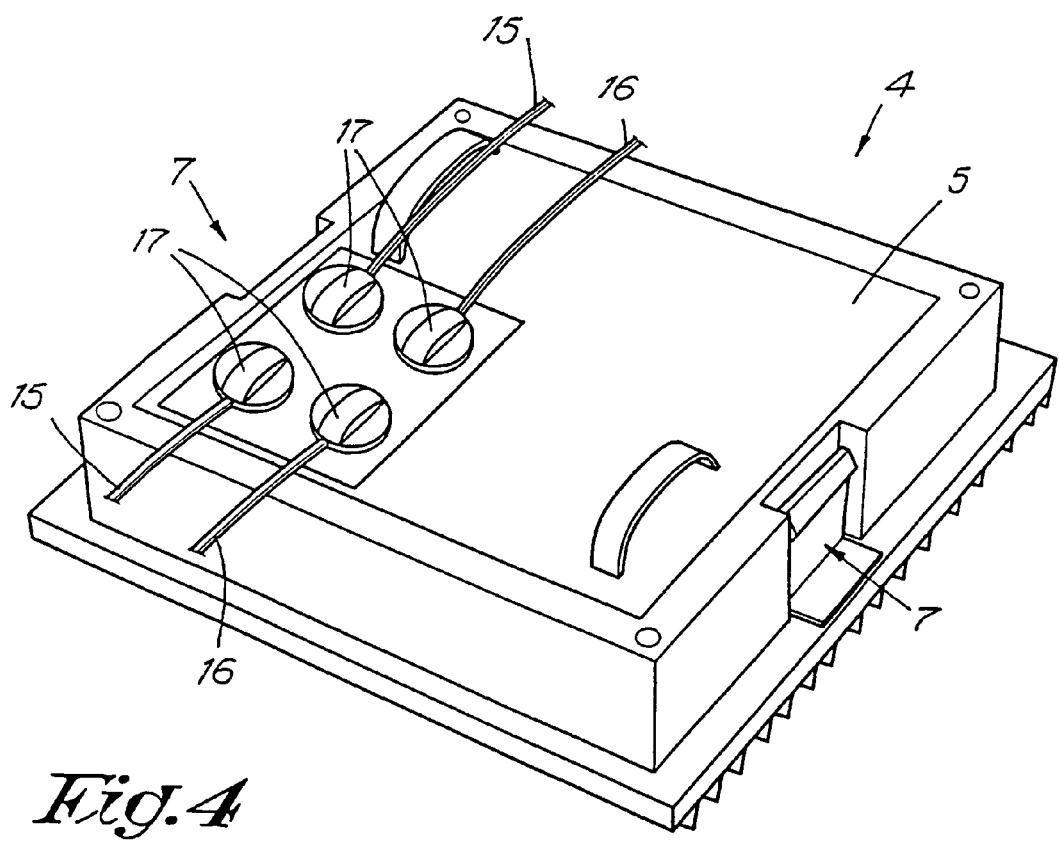
FIG. 4 represents the back side of the module from FIG. 2 in perspective.

As represented in FIGS. 2 to 4, the display units 4 consist of tile-shaped modules which, as represented in FIG. 1, can be assembled by attaching them on an appropriate supporting structure, for example a frame 6.

The modules are preferably fastened in the frame 6 in a detachable manner, for example by making use of fastening elements 7, as represented in FIG. 4, with which the modules can be snapped in the frame 6.

The image side 8 of the display units 4 is equipped with luminous elements, in particular LED's (Light Emitting Diodes), which are indicated hereafter in a general manner with the reference 9, but which are indicated with the references 9A to 9E when represented in detail.

The LED's 9A and 9E are red for example, whereas the LED's 9B and 9D are green and the LED's 9C are blue. By controlling the respective LED's 9A–9E and by thus making the different colours illuminate with different intensities, it is possible to realise any colour whatsoever when seen from a distance. Every set of LED's 9 hereby forms a pixel of the images to be formed. It should be noted that such a pixel can be composed in different ways, of three colours or of a combination of different groups of LED's 9. Thus, for example, the LED's 9A–9B–9C form a group of basic colours with which all colours can be formed. The same goes for the LED's 9B–9C–9E as well as for 9D–9C–9E and 9A–9C–9D.

Figure 5:
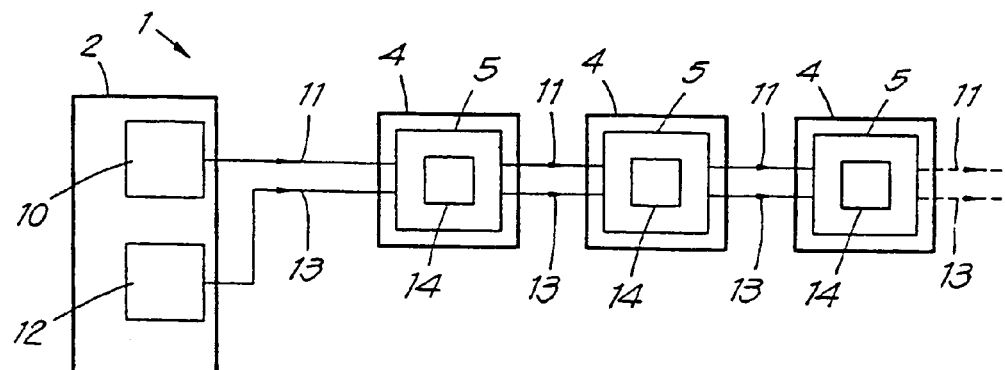
FIG. 5 represents the display device in the form of a block diagram.

The invention is special in that the display device 1, as is schematically represented in FIG. 5, is equipped with means 10 which at least transmit data concerning the image to be displayed transmitted from the general processing unit 2 to the individual processing units 5 in the form of a data stream 11; means 12 providing for a control communication between the general processing unit 2 and each of the individual processing units 5 in the form of control signals 13; and, per individual processing unit 5, means 14 which collect data from the data stream 11 as a function of the transmitted control signals 13 for further processing and display on the image surface, in this case the LED panel, of the display unit 4 concerned.

It should be noted that the data stream 11 and the control signals 13 are only represented schematically in the diagram of FIG. 5 and that, in reality, the data stream 11 and the control signals 13 are not necessarily carried via two different data lines. The data stream 11 and the control signals 13 may consist of a single pulse train in which certain intervals are reserved for the data stream 11 and other intervals are reserved for the control signals 13.

For practical reasons, however, it may be necessary to make different connections between the individual processing units 5, for example in the case where a separate data processing is provided for the different colours, for the control of the red, green and blue LED's 9 respectively, whereby it is transmitted separately per colour to the processing units 5.

Thanks to the design according to FIG. 5, however, it is possible to use a restricted number of electric connections between the successive display units 4, and they can be coupled serially by means of a number of electric cables 15–16, in particular twisted pairs, which are provided with multipolar connectors 17 which can be plugged in the back side of the processing units 5.

According to a special aspect of the invention, a distributed signal processing is provided for between the general processing unit 2 on the one hand and the individual processing units 5 on the other hand. This implies that a number of data are processed and calculated in the general processing unit 2, whereas a number of other data are processed and calculated in each of the individual processing units 5.

This distributed signal processing can be carried out at different levels.

According to a first aspect, a distributed signal processing of the signals related to the colour rendering is provided for, in other words a distributed colour processing. Also a distributed signal processing related to the brightness and/or contrast can hereby be provided for.

In particular, one or several adjustments are made at the general processing unit 2 related to one or several of the following possibilities:
 image stabilisation and/or noise suppression;
 tracking of the illumination of the image, in other words 'luminance tracking', whereby certain values of the luminance are included;
 histogram equalisation as a function of the entire image to be displayed;
 observing of what is called cue flash and acting appropriately in case of such a cue flash;
 reduction of the image in relation to the original input image in the horizontal and/or vertical direction.

This implies that the noise suppression is done in a general manner for the entire image display.

Luminance tracking implies determining for example a fixed relation between the different colours beneath a certain luminance before the signals concerned are transmitted to the individual processing units 5.

By histogram equalisation is meant that a histogram of the entire image content is made and that an evaluation is subsequently made and, if necessary, corrections will be made as a function thereof before the data stream 11 is transmitted to the processing units 5.

Figure 6:
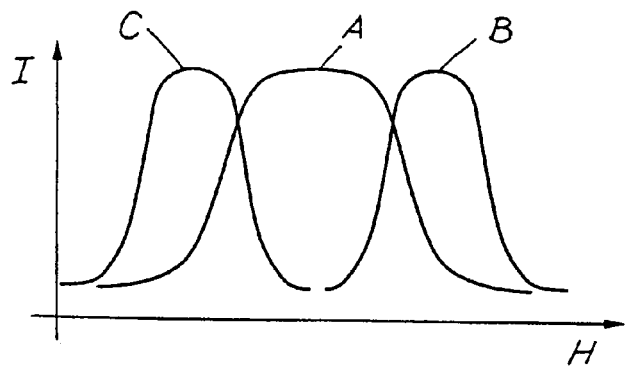
FIG. 6 represents a number of histograms with reference to images to be displayed.

By way of illustration, FIG. 6 represents different curves which can be found in a histogram. H hereby represents the luminance value and I the number of times such values occur in this image. The curves represent all the pixels of the image.

In the case of an image which is generally rather grey, a curve A is obtained, a bright image produces the curve B and a dark image the curve C.

As a function of the nature of the curve, either curve A, B or C, a correction can thus be made. One possibility is that, when signals are observed indicating that the image is dark (curve C), the data stream 11 is adjusted such that the darkness is stressed, whereas when signals are observed indicating that the image is bright (curve B), the data stream 11 is adjusted such that the brightness is stressed. In case of curve A, for example, no correction is made.

The adjustments resulting from the evaluation of the histogram can also be linked to time. This implies that also alterations in the histogram for each of the successive images are detected and taken into account. In case of slow alterations, alterations in the output signal will be made less quickly, as a result of which is obtained a stabilisation effect.

What is called a cue flash is a sudden alteration of the entire image content, in other words a sudden change in the displayed image. It is clear that, at such a moment, the alteration should not be ignored. A detection of the cue flash allows for appropriate action at that moment.

In order to obtain a distributed signal processing, one or several individual adjustments are made at the individual processing units 5 as well. In particular, these adjustments concern one or several of the following possibilities:

adjustment of the colour co-ordinates;
adjustment of the brightness;
adjustment of the contrast;
corrective adjustment as a function of the temperature and/or age of the display unit 4;
adjustment of the transfer functions RGB (red, yellow, blue);
enlargement of the incoming video signal in the horizontal and/or vertical direction.

A number of these items will be illustrated in greater detail hereafter.

By colour co-ordinates are meant the co-ordinates in the chromaticity diagram. These co-ordinates determine what colour is visually observed, and they depend on several factors. Thus, for example they are linked to the age of the display unit 4, such that the adjustment must be made individually. However, the adjustment contributes to the general smoothness and uniformity of the colour reproduction in the image.

In order to adjust and improve the contrast, different modes are applied in the individual processing units 5, whereby the linear connection between the input signal and the output signal is adjusted towards a non-linear connection, whereby for example dark signals are further reduced in order to make sure that the LED's 9 remain switched off in case of signals indicating that there is a very dark image part, whereas for example signals indicating that there is a bright image, are reinforced.

Thus can be obtained among others that when the viewer is situated close to the display 3, the dark passages will indeed be perceived as being dark, and any annoying flashing of the LED's 9 which can be perceived from nearby is excluded.

In particular, a dynamic sample weight distribution is applied above, whereby the individual processing units 5 are informed via the control signals 13 of what curve should be followed during the transformation of the linear course into the non-linear course, depending on the aimed effect.

This technique allows for a refined contrast rendering without requiring a large number of contrast level differences in the signal of the general processing unit 2 towards the individual processing units 5. By using different curves, it is possible to create different results, and transmitting a restricted signal from the general processing unit 2 to the individual processing units 5 will suffice to indicate to the latter what curve should be followed.

By providing for a corrective adjustment as a function of temperature and/or age per display unit 4, and thus also per individual processing unit 5, also other influences of temperature and/or age known as such are separately dealt with, and on condition that there is an appropriate control, differences between the displayed image in each of the display units 4 are excluded. Thus, it is possible to remove display units 4 from the display 3 and to replace them at any time, without any disadvantages. It is also possible to build a display 3 of any size whatsoever, even when it contains display units 4 which have been in use for a shorter time than a number of the other display units 4. By age should in this case mainly be understood the total time during which a display unit 4 has been switched on.

The temperature correction offers the advantage that mutual deviations resulting from temperature differences, irrespective of the cause of these temperature differences, are excluded. Said temperature differences may occur for example when, for a longer length of time, only a part of the display 3 is driven so as to form an image, whereas from a certain moment on, the entire display 3 is used. Consequently, the display units 4 which have not been in use until then will not function at operating temperature, and an adjustment because of the temperature differences is advisable.

According to another aspect of the invention, also a distributed signal processing of the signals related to the image display, in other words a distributed image processing, is provided for.

An example of such distributed image processing consists in that a distributed signal processing is provided for which makes sure that, both at the general processing unit 2 and at the individual processing units 5, measures are taken to minimise image flickering.

According to the invention, the line frequency is raised to this end in the general processing unit 2 in order to eliminate what is called the interline flicker. It will be raised for example from 15 kHz to 32 kHz.

However, in the individual processing units 5, one or several individual adjustments are made which make sure that every display unit 4 operates frequency-independent vertically and horizontally. This adjustment consists for example in realising an automatic pulse width adjustment and/or in carrying out a frequency raise to eliminate what is called surface flicker.

The pulse width adjustment offers the advantage that one can for example automatically switch from a 50 Hz system to a 60 Hz system without any discontinuities being perceived in the displayed image. The automatic pulse width adjustment is preferably carried out by creating free spaces in between the pulses, whose interval is adjusted such that the entire signal becomes totally continuous.

The frequency is raised from for example 50/60 Hz to at least 100 Hz and better still to 400 Hz.

According to yet another aspect of the invention, a distributed signal processing of the signals determining the image geometry is provided for.

In order to obtain a certain image geometry, control signals 13 are hereby transmitted to the individual processing units 5 which indicate which part of the image should be displayed at the display unit 4 concerned, whereby the individual processing units 5 then collect data from the data stream 11, process them and display them, as a function of said control signals 13.

An example thereof is represented in FIG. 7, whereby the entire image which is normally displayed in the rectangle defined by the entire surface of the display 3, is compressed into a triangle 18. The image B1 of the picture line 19 must hereby no longer be displayed over the distance X, but over the short distance Y. In this case, the display units 4A and 4B will not be ordered to collect data from the data stream 11 via the communication protocol which is contained in the control signals 13, whereas the display unit 4C will be ordered to collect all the image information of the image B1 from the data stream 11, and to display this image B1, of the picture line 19, over the distance Y. The general processing unit 2 hereby only gives a command, whereas the recalculation for the display of the image B1 over the distance Y is carried out in the processing unit 5 of the display unit 4C.

According to another aspect of the invention, a dynamic image stabilisation is provided for.

To this end, one or several of the following techniques are preferably used:
a time-dependant image stabilisation, whereby it is verified for pixels of the image how alterations in time occur between successive images, and whereby an image stabilisation effect is provided for before the images are displayed, for example by ignoring or attenuating brief alterations;

a frequency-dependant image stabilisation, whereby it is verified how alterations occur in pixels of the image situated next to one another, and whereby an image stabilisation effect is provided for before the images are displayed;

an amplitude-dependant image stabilisation;

an image stabilisation as a function of the entire image content.

Such an image stabilisation can be realised either exclusively at the general processing unit 2 or exclusively at the individual processing units 5, but also distributed over both.

It should be noted that the improvement of the image display by means of such a dynamic image stabilisation can also be applied in other display units 1 than those described above, namely also in display units which are not assembled from different display units 4 and which do not necessarily have to be of the LED type. Hence, as far as the dynamic image stabilisation is concerned, the invention is not restricted to the above-described display device 1, and it also extends to other display devices, including CRT projectors, picture tubes, etc.

According to a special characteristic of the invention, both the signals of the data stream 11 and the control signals 13 are successively displayed from one display unit 4 to the next, and a number of, preferably each of the individual processing units 5 is provided with a master clock correction. This implies that all the signals, at each transition to a subsequent display unit 4, are again optimally adjusted to one another, so that possible transmission errors are excluded, if not minimised.

In practice, different signals are preferably used for the basic colours red/green/blue (RGB signals), and possible transmission errors in these RGB signals are minimised thanks to the above-mentioned master clock correction, in particular a cumulation of shifts and errors resulting from what is called jitter is counteracted at the master clock.

Such a master clock correction is preferably carried out by means of a proprietary crystal clock in each of the individual processing units 5.

Practically, the LED's 9 are driven by means of an uninterrupted current during normal operation, whereby the length of time for which the current is switched on is used as a control parameter. Moreover, in order to adjust the brightness and contrast, the value of the above-mentioned current can be altered.

It is clear that the general processing unit 2 and the individual processing units 5 are equipped with the necessary electronic circuits in order to process the data as described above, in other words to realise the above-mentioned means 10, 12 and 14. Any craftsman can derive from the above-described operations how these circuits should be built.

It should be noted that the display device 1 preferably also contains means to automatically recognise the position of a display unit 4 in the total image surface. These means consist for example in that, when the processing unit 2 is switched on, it assigns the address '1' to the first display unit 4 coupled in series, the address '2' to the second one, and so on. In case of a systematic 'through' coupling as represented in FIG. 1, and when the number of display units 4 are put in per row, as well as the number of rows of display units 4 among themselves, the processing unit 2 will automatically determine the position of each display unit 4 in the total display 3.

The invention is by no means limited to the above-described embodiment represented in the accompanying drawings; on the contrary, such a method for displaying images on a display device, as well as the device used to this end, can be made in all sorts of variants while still remaining within the scope of the invention.

The invention claimed is:

1. A method for displaying images on a display device, the display device including at least one general processing unit and a display comprising a plurality of display units with corresponding processing units, the method comprising the steps of:

transmitting a data stream comprising data concerning the image to be displayed from the general processing unit to the individual processing units;

providing a control communication comprising a plurality of control signals between the general processing unit and each of the individual processing units, the control communication sent from the general processing unit to each of the individual processing units being individually distinct from the data stream sent to each processing unit;

collecting data from the data stream at each of the individual processing units as a function of control signals transmitted to the individual processing units;

providing distributed signal processing between the general processing unit and the individual processing units;

providing a distributed signal processing for the signals related to the image display; and raising the line frequency in the general processing unit in order to eliminate interline flicker and to obtain higher image resolution.

2. The method according to claim 1, wherein the display units are serially coupled.

3. The method according to claim 1, wherein the display units consist of LED panels.

4. The method according to claim 1, wherein the distributed signal processing is at least provided for signals related to color rendering, and/or brightness, and/or contrast.

5. The method according to claim 4, further comprising the step of making at least one individual adjustment at the individual processing units, said at least one individual adjustment being selected from the group consisting of: adjustment of the color coordinates, adjustment of brightness, adjustment of contrast by dynamic sample weight distribution, corrective adjustment as a function of the temperature and/or age of the display unit, adjustment of the transfer functions, and enlargement of the incoming video signal in the horizontal direction and/or vertical direction.

6. The method according to claim 5, wherein contrast adjustment comprises adjusting the linear connection between the input signal and the output signal towards a non-linear connection in each individual processing unit as a function of the command provided by the control signals.

7. The method according to claim 5, wherein at least one individual adjustment is made at the general processing unit, said adjustment being selected from the group consisting of: image stabilization and/or noise suppression, tracking of the illumination of the image, histogram equalization as a function of the entire image to be displayed, observing a cue flash and making a correction, and reduction of the image in relation to the original input image in the horizontal direction and/or vertical direction.

8. The method according to claim 1, further comprising the step of providing distributed signal processing to minimize image flickering of the general processing unit and the individual processing units.

9. The method according to claim 1, further comprising the step of making individual adjustments to maintain the display unit in operating frequency-independent both vertically and horizontally.

10. The method according to claim 1, wherein an automatic pulse width adjustment is realized in the individual processing units.

11. The method according to claim 1, further comprising the step of raising a frequency in the individual processing units to eliminate surface flicker.

12. The method according to claim 1, further comprising the step of providing distributed signal processing at least for signals which determine image geometry.

13. The method according to claim 12, further comprising the step of transmitting control signals to the individual processing units to indicate which part of the image should be displayed at the display unit, the individual processing units collecting data from the data stream, processing the data and displaying the data as a function of the control signals.

14. The method according to claim 1, comprising the step of providing for dynamic image stabilization.

15. The method according to claim 14, wherein at least one technique is applied for the dynamic image stabilization, said at least one technique being selected from the group consisting of:
   a time-dependent image stabilization arranged for verifying pixels of an image and including determining alterations occurring between successive images and providing an image stabilization effect before the images are displayed;
   a frequency dependent image stabilization arranged for verifying how alterations occur in pixels of an image positioned next to one another and providing an image stabilization effect before the images are displayed;
   an amplitude-dependent image stabilization; and
   an image stabilization as a function of an entire image content.

16. The method according to claim 1, wherein the individual processing units are provided with master clock correction.

17. The method according to claim 16, wherein different signals are used for red, green and blue signals, and transmission errors in the red, green and blue signals are minimized due to the master clock correction.

18. The method according to claim 1, wherein the display includes a plurality of LEDs driven by an uninterrupted current during operation such that the length of time for which the current is switched on is used as a control parameter.

19. The method according to claim 18, wherein the current is altered to adjust the brightness and the contrast.

20. The method according to claim 1, wherein the data stream and the control signals are transmitted via separate data lines.

21. The method according to claim 1, wherein the data stream and the control signals comprise a single pulse train such that a first plurality of intervals of the single pulse train are reserved for the data stream, and a second plurality of intervals of the single pulse train are reserved for the control signals.

22. The method according to claim 1, wherein the data stream and the control signals are transmitted to each of said display units, and at least some of the individual processing units are provided with a master clock correction arrangement.

* * * * *